United States Patent [19]

Hawks et al.

[11] 4,124,097

[45] Nov. 7, 1978

[54] WHEELCHAIR LIFT DEVICE

[75] Inventors: Dale A. Hawks, Clarkston; Daniel L. Kline, Utica; James T. Hogan, Oxford, all of Mich.

[73] Assignee: General Motors Corporation, Detroit, Mich.

[21] Appl. No.: 839,321

[22] Filed: Oct. 4, 1977

[51] Int. Cl.² .......................... B60P 1/44; B60R 3/02
[52] U.S. Cl. ................................ 187/9 R; 214/75 R; 280/166
[58] Field of Search .................. 187/1 R, 9 R, 10; 214/75 R, 75 H, 75 G, 75 T; 280/166; 296/62; 105/443, 447, 449

[56] References Cited

U.S. PATENT DOCUMENTS

| 461,156 | 10/1891 | Barber | 105/447 |
|---|---|---|---|
| 3,368,704 | 2/1968 | Pope | 214/75 R |
| 3,488,066 | 1/1970 | Hansen | 280/163 |
| 3,572,754 | 3/1971 | Fowler | 280/166 |
| 3,675,593 | 7/1972 | Tonne et al. | 280/166 |
| 3,913,497 | 10/1975 | Maroshick | 105/447 |
| 3,918,596 | 11/1975 | Ward | 214/75 R |
| 3,957,284 | 5/1976 | Wright | 280/166 |
| 4,027,807 | 6/1977 | Thorley | 214/75 R |
| 4,029,223 | 6/1977 | Adamski et al. | 214/77 R |
| 4,039,091 | 8/1977 | Adamski et al. | 214/77 R |

Primary Examiner—Evon C. Blunk
Assistant Examiner—Jeffrey V. Nase
Attorney, Agent, or Firm—Edward J. Biskup

[57] ABSTRACT

A wheelchair lift device including a platform located in the stepwell of a motorcoach for raising and lowering a wheelchair between a first position wherein the platform is in horizontal alignment with an elevated floor formed with the motorcoach and a second position wherein the platform is at ground level. The device includes foldable hinged sections that are positioned through a linkage to form steps for use by able-bodied persons and are extendible laterally outwardly relative to the stepwell so as to align the hinged sections along a horizontal plane and thereby form the platform for supporting the wheelchair.

3 Claims, 5 Drawing Figures

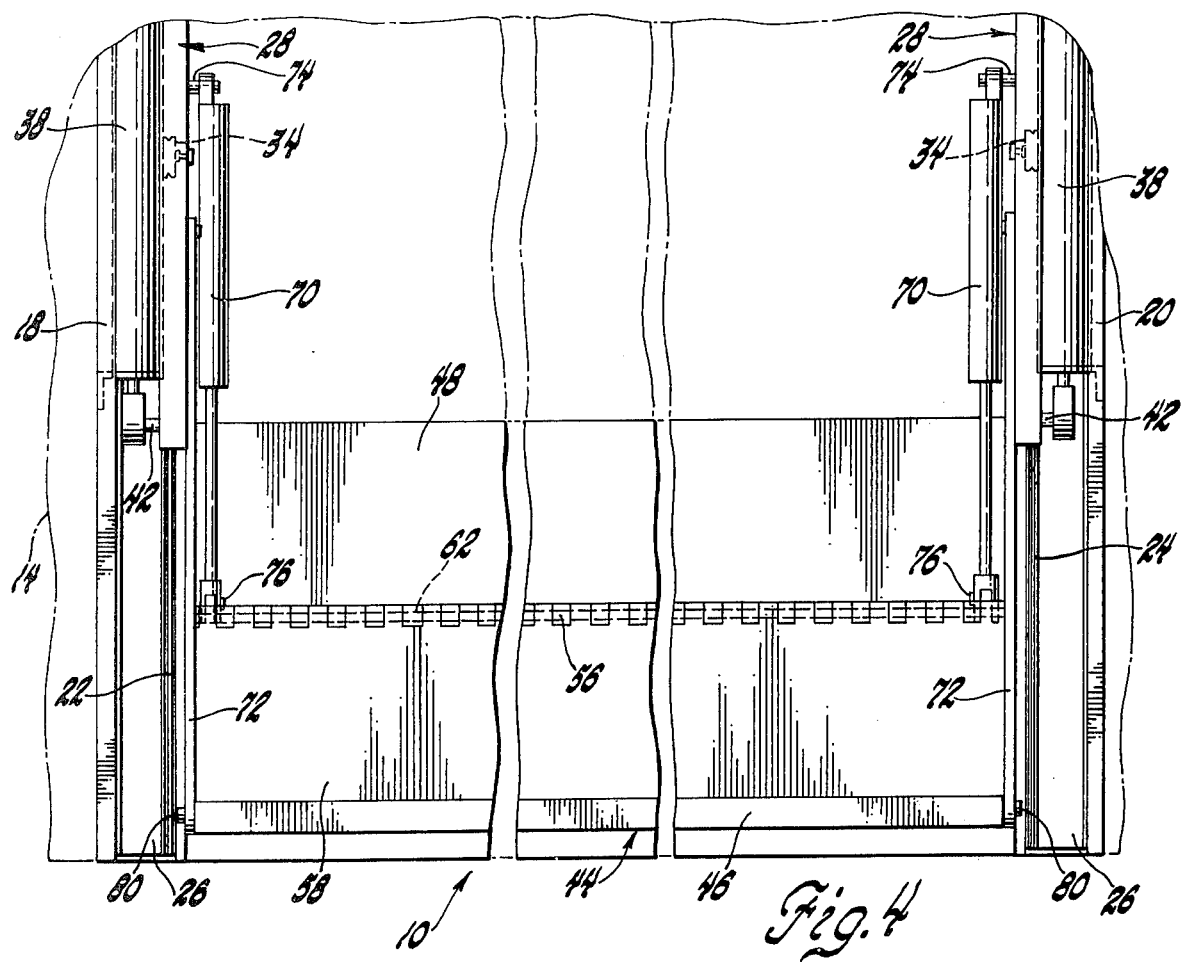
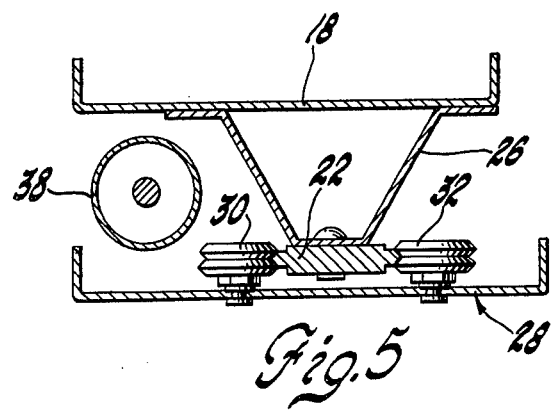

WHEELCHAIR LIFT DEVICE

This invention concerns elevator devices in general and more particularly a wheelchair lift device that can be used with a motor vehicle.

Copending patent application Ser. No. 839,320 filed Oct. 4, 1977, entitled "Wheelchair Lift Device," in the names of Peter P. Dudynskyj, Daniel L. Kline and James T. Hogan, and assigned to the assignee of this invention, discloses a lift device for use in a motorcoach that employs a parallelogram type linkage actuated by an expandable hydraulic cylinder for converting a foldable step assembly into a horizontal support for a wheelchair. Also, copending patent application Ser. No. 389,428 filed Oct. 4, 1977, entitled "Wheelchair Lift Device," in the name of Peter P. Dudynskyj and assigned to the assignee of this invention discloses a lift device for a wheelchair that is characterized in that it uses a rotatable arm member which serves to move the foldable step assembly in an arc for converting the step assembly into a support platform for the wheelchair and for locating the deployed platform between a floor level position and a ground level position.

This invention concerns a wheelchair lift device of the type described in the above mentioned patent applications and is an improvement thereover in that a simplified support linkage for the support platform is employed that consists of two link members one of which is a linearly extensible and contractible actuator used for deploying the platform. Another feature of this invention is that the support linkage is combined with a lock device which serves to maintain the supporting carriage in a locked position and is automatically released for carriage lowering upon deployment of the platform. More specifically, the wheelchair lift device according to the invention includes a pair of substantially vertically oriented guide bars secured to the body of the vehicle on the opposite sides of the doorway that opens into a stepwell that leads into the interior of the vehicle. A carriage is mounted on each of the guide bars for movement from a raised position to a lowered position. A pair of links connect the carriage with a platform assembly which includes a plurality of hinged sections that normally form a stairway having treads and risers when the carriage is in the raised position. One of the links consists of a power-operated linearly extensible and contractible member while the other link is a rigid member with one end pivotally connected to the carriage and the other end connected to one of the hinged sections. The arrangement of the links and the hinged sections is such that when the power-operated link member is contacted, the hinged sections move laterally outwardly relative to the doorway and cause the platform assembly to be formed into a horizontal support located in the plane of the vehicle floor. After the platform assembly is deployed in line with the vehicle floor, the carriage then is moved from the raised position to the lowered position so as to place the wheelchair support at ground level.

The objects of the present invention are to provide a new and improved wheelchair lift device for a motor vehicle having a movable carriage which through a pair of link members supports a plurality of hinged sections that normally form a series of steps and when desired, can be converted into a horizontal platform for supporting a wheelchair; to provide a new and improved wheelchair elevator that can be incorporated in the stepwell of a bus and that includes a plurality of hinged angularly related members which normally form a series of steps and are movable by a linearly extensible and contractible motor laterally outwardly relative to the stepwell under the control of a rigid link so as to cause the hinged members to be horizontally aligned and form a platform for supporting a wheelchair; to provide a new and improved wheelchair lift device for the stepwell of a bus that has a pair of link members located along intersecting axes for supporting a plurality of hinged sections with one of the link members being selectively extensible and contractible so as to cause the hinged sections to alternately form stairs for able-bodied persons and a horizontal support platform for a physically handicapped person using a wheelchair; and to provide a new and improved wheelchair lift device that can be located in the stepwell opening of a bus and has foldable hinged sections that are positioned through a linkage to form steps and are extensible laterally outwardly relative to the opening by the shortening of one of the link members so as to align the hinged sections along a horizontal axis and thereby form a support platform for a wheelchair.

Other objects and advantages of the invention will be more apparent from the following detailed description when taken with the drawings in which:

FIG. 4 is a view taken on lines 4—4 of FIG. 1; and

FIG. 5 is an enlarged sectional view taken on lines 5—5 of FIG. 1.

Figure 1:
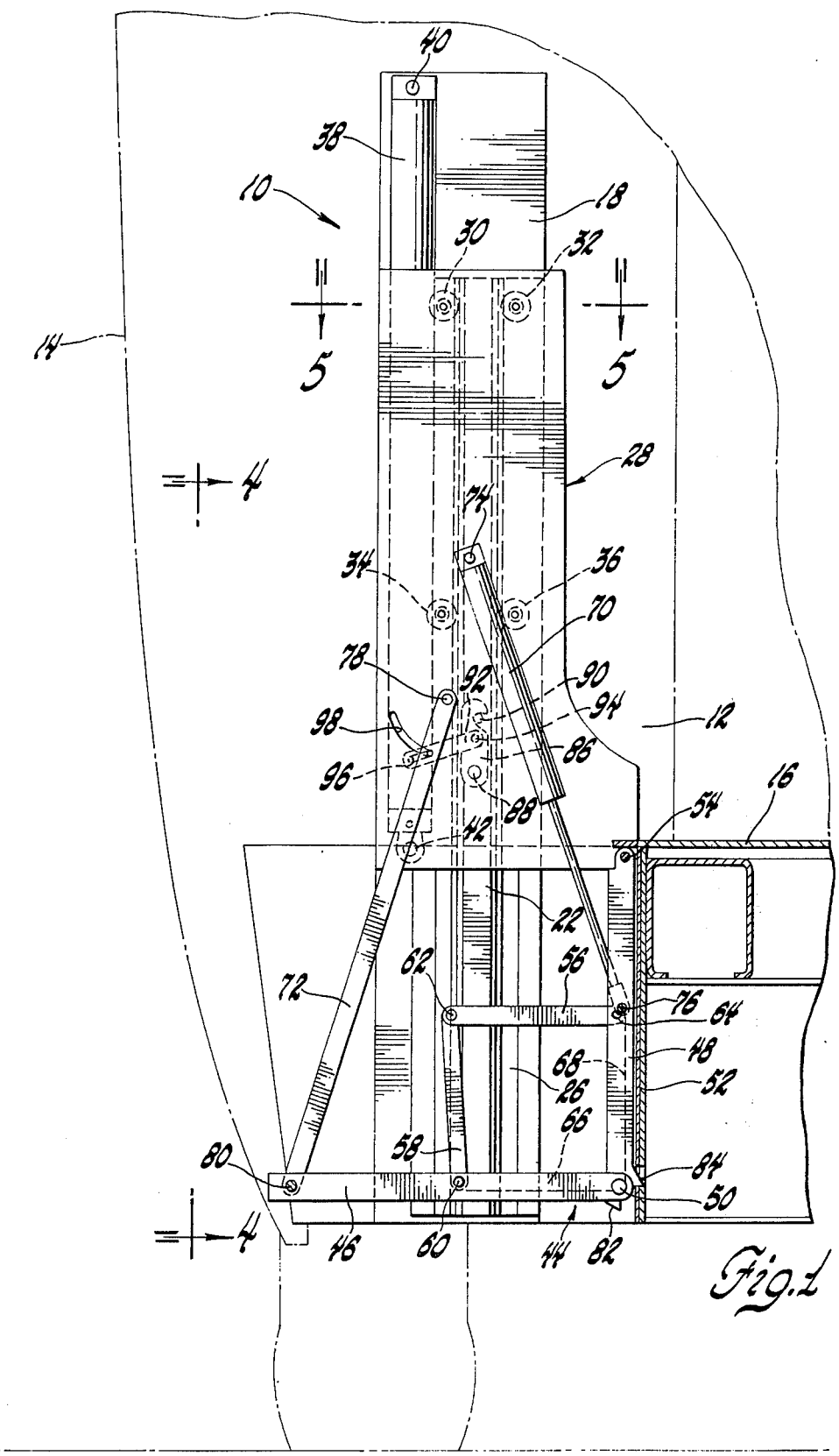
FIG. 1 is an elevational view showing a wheelchair lift device made in accordance with the invention and incorporated in the stepwell of a motorcoach.

Referring to the drawings and more particularly FIGS. 1, 4, and 5 thereof, a wheelchair lift device 10 made in accordance with the invention is shown positioned within the stepwell 12 of a motor vehicle 14 such as a coach or bus of the type used in mass public transit having the usual floor 16 which is at an elevation substantially above ground level. As will be more apparent as the description of the invention proceeds, the wheelchair lift device 10 provides the usual two steps in the stepwell 12 of the vehicle permitting normal entry and exit for able-bodied passengers. In addition, and when it is desired, the steps of the wheelchair device 10 can be converted through a suitably arranged linkage into a horizontal support for a wheelchair that can be moved between an aligned position with the vehicle floor 16 and a ground level position. In this manner, a physically handicapped person confined to a wheelchair can be served by the vehicle 14.

More specifically, the wheelchair lift device 10 comprises a pair of frame members 18 and 20 spaced along an axis parallel to the longitudinal axis of the vehicle 14 and located in the stepwell 12 of the vehicle 14. The frame members 18 and 20 are secured in vertical positions to the associated frame structure of the vehicle 14 and respectively rigidly support vertically disposed guide bars 22 and 24 each of which is secured to the associated frame member through a generally "V" shaped bracket 26 as seen in FIG. 5. Each of the guide bars 22 and 24 has the side edges thereof shaped in the form of a "V" when viewed in cross section in FIG. 5, and is adapted to support a carriage 28. In this connection, it will be noted that each carriage 28 includes an upper pair of horizontally aligned rollers 30 and 32 and a lower pair of horizontally aligned rollers 34 and 36 which engage and ride along the associated guide bar. A double-acting hydraulic cylinder 38 is mounted to each of the frame members 18 and 20 and is connected to the carriage 28 for moving the latter between the positions shown in FIG. 1 and that shown in FIG. 3. The hydraulic cylinders 38 are identical in size and each includes a cylinder member and a relatively movable piston member. As seen in FIG. 1, the cylinder member has its base end connected to the associated frame member by a pivot connection 40 while the rod end of the piston member is connected to the carriage 28 by a pivotal connection 42. Accordingly, when pressurized fluid is directed to the base ends of the hydraulic cylinders 38 while the piston end thereof is vented, the piston rods are moved vertically downwardly resulting in the carriages 28 being moved from the position of FIG. 1 to that shown in FIG. 3. This movement causes a platform 44, after it is deployed, to be moved as a unit from an elevated position to a ground level position as will be explained hereinafter.

It will be noted that the aforementioned steps form a part of the platform 44 which is located in the stepwell 12. The platform 44 consists of a plurality of hinged sections that extend between the guide bars 22 and 24 as seen in FIG. 4. As seen in FIG. 1, the platform 44 comprises a pair of planar base sections 46 and 48 which are pivotally interconnected at their inner ends by a pivotal connection 50 for movement about a horizontal axis that is substantially parallel to the longitudinal axis of the vehicle. As seen in FIG. 1, the platform 44 is shown in the collapsed or folded position wherein it is disposed adjacent to a vertical back wall 52 formed rigidly with the body of the vehicle 14. In the collapsed position, the base section 48 is located in a vertical plane adjacent back wall 52 and has its upper end connected by pivotal connection 54 to the carriage 28, while the base section 46 is located in a horizontal plane. The base sections 46 and 48 support a tread member 56 and a riser member 58 which are sections of the platform that also extend between the guide bars 22 and 24 as seen in FIG. 4. The riser member 58 has one end connected by a pivotal connection 60 to the base section 46 intermediate the ends thereof. The other end of the riser member 58 is connected to one end of the tread member 56 by a piano hinge that provides a pivotal connection 62 as seen in FIG. 1. The other end of the tread member 56 is connected to the base section 48 by a pivotal connection 64 intermediate the ends of the base section 48. The base section 46, between pivotal connections 60 and 50, and the base section 48, between pivotal connections 50 and 64, are respectively formed with wells 66 and 68 having a depth and longitudinal length corresponding to the width and longitudinal length of the associated tread and riser members 56 and 58 so as to allow storage of the latter when the platform 44 is deployed to the extended or unfolded position shown in FIGS. 2 and 3.

Figure 2:
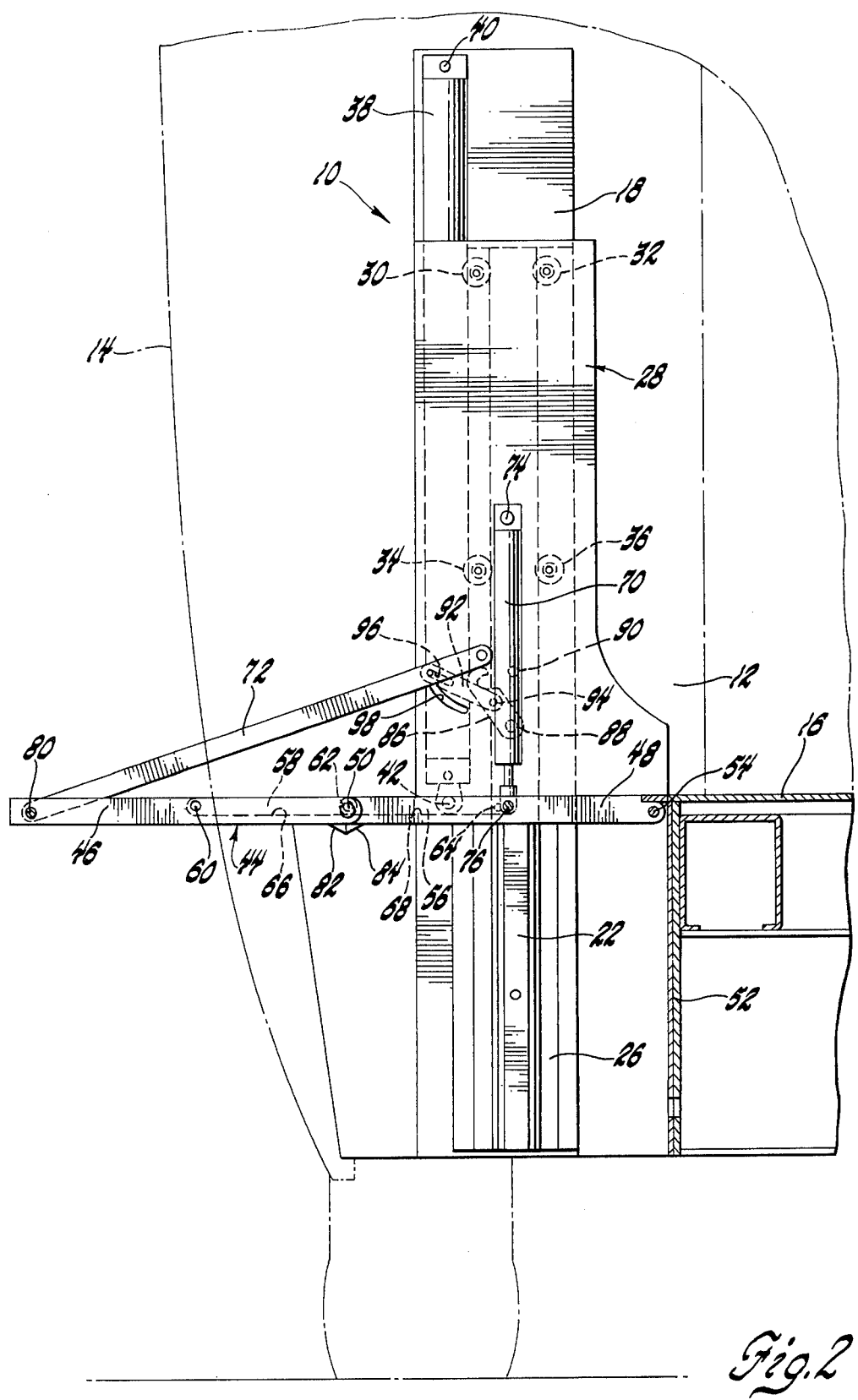
FIG. 2 is a view similar to FIG. 1 with the platform of the wheelchair lift device being deployed in line with the floor of the motorcoach.
Figure 3:
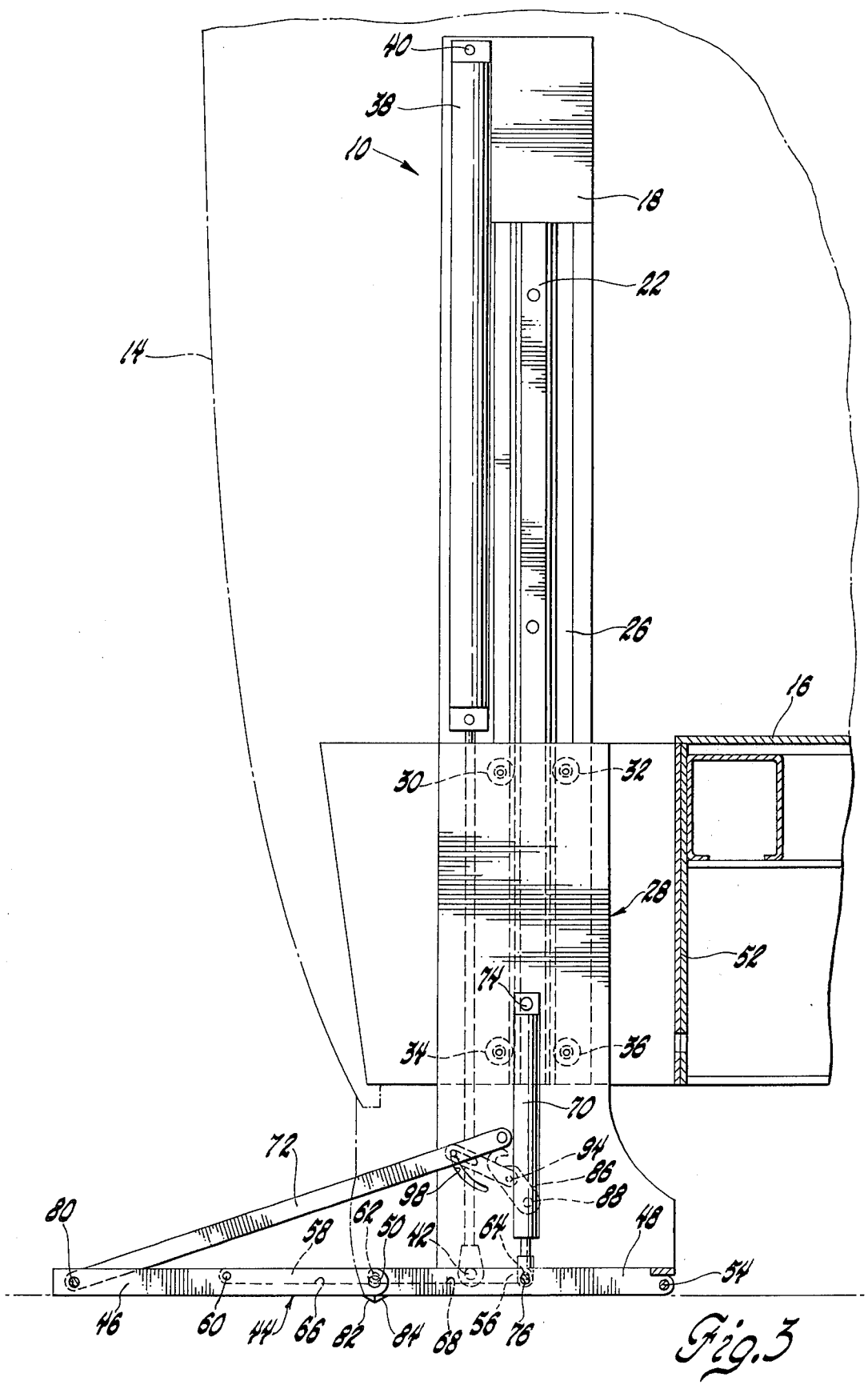
FIG. 3 is a view of the wheelchair lift device similar to that shown in FIGS. 1 and 2 with the platform being positioned at ground level.

The deployment of the platform 44 to the unfolded positions of FIGS. 2 and 3 is realized through a two-link supporting linkage arrangement incorporated with each of the carriages 28. The linkage arrangement includes a double-acting hydraulic cylinder 70 that serves as an extensible and contractible link member. In addition, a rigid link member 72 is provided and together with the hydraulic cylinder 70 is carried by the carriage 28. The hydraulic cylinder 70 consists of a cylinder member and a relatively reciprocating piston member with the base portion of the cylinder member being connected to the carriage 28 by a pivotal connection 74. The piston member of the hydraulic cylinder 70 is connected to the base section 48 intermediate the ends thereof by a pivotal connection 76. The rigid link member 72 has one end thereof pivotally connected to the carriage 28 by a pivotal connection 78 while the other end is connected to the outboard end of the base section 46 by a pivotal connection 80.

From the above description, it should be apparent that when the wheelchair lift device 10 has the parts thereof located in the normal position as seen in FIG. 1, the tread and riser members 56 and 58 are disposed in substantially mutually perpendicular planes so as to form the riser and tread portions of a one step while the outer end of the base section 46 forms the tread portion of a second step. Thus, an able-bodied person can gain entrance into the vehicle 14 by first stepping on the outer end of the base section 46 and then on the tread member 56 and finally on the floor 16 of the vehicle. If, however, a physically handicapped person in a wheelchair should wish to gain entrance into the vehicle 14, the vehicle operator would actuate a control valve of a suitable hydraulic control system (not shown) that would direct pressurized fluid to the piston rod end of the hydraulic cylinder 70 while venting the base end of the cylinder member. This would cause contraction of the hydraulic cylinder 70 by having the piston rod thereof drawn into the cylinder member with resultant pivoting of the base section 48 in a clockwise direction about the pivotal connection 54. As the base section 48 rotates in this manner, it carries the base section 46 upwardly and outwardly relative to the stepwell 12 about the same pivotal connection 54 under the control of the link member 72 which is pivoted in a clockwise direction about pivotal connection 78. This movement of the link members 70 and 72 continues until the base sections 46 and 48 are horizontally aligned with the floor 16 of the vehicle as seen in FIG. 2. In order to assure proper alignment, stop tabs 82 and 84 can be provided on the base sections 46 and 48 respectively adjacent the pivotal connection 50. At this point, the platform 44 is fully deployed to form a horizontal support surface for the wheelchair.

It will be noted that as the platform 44 moves from the folded or collapsed position of FIG. 1 to the deployed position of FIG. 2, the tread and riser members 56 and 58 move into the associated wells 66 and 68 formed in the base sections 46 and 48 so as to provide a substantially level, flat support surface. After the platform 44 is in the position of FIG. 2, the operator, through the appropriate movement of the aforementioned control valve, will cause the base end of the hydraulic cylinder 38 to be pressurized while the piston rod end thereof is vented. As a result, the piston rod of the hydraulic cylinder 38 moves out of the associated cylinder member and causes the associated carriage 28 to move downwardly along its guide bar and at the same time lowers the platform 44 from the elevated position of FIG. 2 to the ground level position of FIG. 3. The wheelchair can then be rolled onto the platform 44 and locked into position. The vehicle operator then reverses the procedure, causing the piston rod end of the hydraulic cylinder 38 to receive pressurized fluid and the base end thereof to be vented so that contraction of the cylinder 38 occurs, resulting in the carriage 28 and the platform 44 to be returned to the FIG. 2 position wherein the platform 44 is once again horizontally aligned with the floor 16. The wheelchair is then rolled onto the floor 16 after which pressurized fluid is directed to the base end of the hydraulic cylinder 70 causing the base section 48 to be rotated in a counter-clockwise direction about the pivotal connection 54 so as to return the various parts of the platform 44 to the folded position of FIG. 1 wherein the steps are formed for normal usage of the vehicle entrance.

Although not shown, it will be understood that the outer end of the base section 46 can be provided with a tapered ramp portion so as to facilitate rolling of the wheelchair onto the platform 44 when the latter is in the ground level position of FIG. 3. Also, in order to eliminate the possibility of an over-center action that could prevent the tread and riser members 56 and 58 from properly returning to the step forming position of FIG. 1 after they are located in the aligned position of FIG. 2, the tread and riser members 56 and 58 can be sized so that the center of the piano hinge or pivotal connection 62 is slightly above a horizontal plane passing through the centers of pivotal connections 60 and 64 when the platform 44 is in the FIG. 2 position. Another manner of accomplishing the same result would be to incorporate a spring at the pivotal connection 62 which would continuously bias the tread and riser members 56 and 58 towards the step forming position of FIG. 1.

One feature of the wheelchair lift device 10 described above is the use of a lock lever 86 that serves to lock the carriage 28 to the associated guide bar when the carriage 28 is in the raised position and the platform 44 is in the folded position of FIG. 1. As seen in FIG. 1, the lock lever 86 is connected at one end to the carriage 28 by a pivotal connection 88 while the other end of the lock lever 86 is formed as a hook that cooperates with a pin 90 fixed with the associated guide bar for locking the carriage 28 in the raised position. The lock lever 86 is automatically released from its engaged or locked position with the pin 90 during the deployment of the platform 44 from the position of FIG. 1 to that shown in FIG. 2. The unlocking action of the lock lever 86 occurs automatically when the link member 72 rotates clockwise about the pivotal connection 78 as seen in FIG. 1. In this connection, it will be noted that a link 92 connects the lock lever 86 to the link member 72 through a pivotal connection 94 and a pin and slot connection 96 with the slot being formed in the link 92 and the pin being fixed with the link member 72. A curved slot 98 formed in the carriage 28 accommodates the pin as the link member 72 rotates from the FIG. 1 position to the FIG. 2 position about pivotal connection 78.

Various changes and modifications can be made in this construction without departing from the spirit of the invention. Such changes and modifications are contemplated by the inventors and they do not wish to be limited except by the scope of the appended claims.

What is claimed is:

1. A lift device having a platform located in the doorway of a motor vehicle for raising and lowering a load between a first position wherein the platform is in horizontal alignment with an elevated floor formed with the motor vehicle and a second position wherein the platform is at ground level, said device comprising a pair of substantially vertically oriented guide bars secured to said vehicle along the opposite sides of said doorway, a carriage having vertically spaced roller means mounted thereon for rotation along each of said guide bars for movement from a raised position to a lowered position, a pair of links connecting the carriage with the platform, said platform including first and second base sections and a tread section and a riser section all pivotally interconnected to each other and adapted to form a stairway that is convertible to a horizontal support for said load, said first base section being located in a vertical plane and said second base section being located in a horizontal plane when said base sections are in a stairway forming position, one of said links being a power-operated linearly extensible member having one end thereof pivotally connected to said carriage at a first pivot point and the other end pivotally connected to said first base section at a second pivot point, the other of said links being a rigid member having one end thereof pivotally connected to the carriage at a third pivot point and the other end thereof pivotally connected to said second base section at a fourth pivot point, the arrangement of said links being such that a straight line connecting said third and fourth pivot points when extended passes between said first and second pivot points when said base sections are in the stairway forming position and in the horizontal support position and the arrangement of the sections being such that contraction of said power-operated linearly extensible member causes the pair of links to swing outwardly relative to the doorway with the base sections and the tread and riser sections of the platform moving into positions to form said horizontal support, and motor means operatively connected to the carriage for moving the platform with the sections horizontally aligned between said first position and said second position.

2. A lift device having a foldable platform located in the doorway of a motor vehicle for raising and lowering a load between a first position wherein the platform is in horizontal alignment with an elevated floor formed with the motor vehicle and a second position wherein the platform is at ground level, said device comprising a pair of substantially vertically oriented guide bars secured to said vehicle at the opposite sides of said doorway, a carriage having vertically spaced roller means mounted thereon for rotation along each of said guide bars for controlling movement of said platform between said first and second positions, said platform comprising a pair of planar base sections, a tread section and a riser section adapted to be moved from a step forming position wherein adjacent sections are angularly disposed relative to each other to a load support position wherein said adjacent sections are located in a horizontal plane, a first pivot connection joining adjacent ends of said pair of base sections for pivotal movement about a horizontal axis, a second pivot connection joining one end of one of said base sections to said carriage, a third pivot connection joining adjacent ends of said tread section and said riser section for pivotal movement about an axis parallel to said horizontal axis, fourth and fifth pivot connections joining said riser section and said tread sections to said base sections whereby said riser and tread sections are movable by said base sections between said step forming position and said load support position, a linkage including a pair of link members connecting the carriage with said base sections for supporting the platform, one of said link members being a power-operated linearly extensible and contractible member having one end thereof pivotally connected to said carriage at a first pivot point and the other end thereof pivotally connected to one of the base sections at a second pivot point, the other of said link members being a rigid member with one end thereof being pivotally connected to said carriage at a third pivot point located below the first pivot point and the other end thereof being pivotally connected to the other of the base sections at a fourth pivot point, said link members being so arranged that a straight line connecting said third and fourth pivot points when extended passes between said first and second pivot points when said base sections are in said step forming position and in said load support position and the sections being so arranged that contraction of said power-operated link member causes the lower portion of the linkage to swing outwardly relative to the doorway whereby the sections move into the load support position, and motor means operatively connected to the carriage for moving the platform between said first and second positions when the sections are in said load support position.

3. A lift device having a foldable platform located in the doorway of a motor vehicle for raising and lowering a load between a first position wherein the platform is in horizontal alignment with an elevated floor formed with the motor vehicle and a second position wherein the platform is at ground level, said device comprising a pair of substantially vertically oriented guide bars secured to said vehicle at the opposite sides of said doorway, a carriage having vertically spaced roller means mounted thereon for rotation along each of said guide bars for controlling movement of said platform between said first and second positions, said platform comprising a pair of base sections, a tread section and a riser section adapted to be moved from a step forming position wherein adjacent sections are angularly disposed relative to each other to a load support position wherein said adjacent sections are located in a horizontal plane, a first pivot connection joining adjacent ends of said pair of base sections for pivotal movement about a horizontal axis, a second pivot connection joining one end of one of said base sections to said carriage, a third pivot connection joining adjacent ends of said tread section and said riser section for pivotal movement about an axis parallel to said horizontal axis, fourth and fifth pivot connections joining said riser section and said tread sections to said base sections whereby said riser and tread sections are movable by said base sections between said step forming position and said load support position, a linkage including a pair of link members connecting the carriage with said base sections for supporting the platform, said link members being positioned so that the longitudinal center axes of said link members intersect each other when said base sections of said platform are in said step forming position and in said load support position, one of said link members being a double-acting hydraulic cylinder having one end thereof pivotally connected to said carriage and the other end thereof pivotally connected to one of the base sections, the other of said link members being a rigid member with one end thereof being pivotally connected to said carriage at a point below the point of connection between said hydraulic cylinder and the carriage and the other end thereof being pivotally connected to the other of the base sections, said first, second, third, fourth and fifth pivot connections and the pivot connections between the link members and the base sections being so arranged that contraction of said hydraulic cylinder causes the lower portion of the linkage to swing outwardly relative to the doorway whereby the sections move from the step forming position into the load support position, linearly extensible and contractible motor means operatively connected to the carriage for moving the platform between said first and second positions when the sections are in said load support position, and a lock device for locking the carriage to the associated guide bar when the platform is in the step forming position, said lock device being operatively connected with said other of said link members whereby movement of the latter during platform conversion from the step forming position to the load support position causes automatic unlocking of said lock device.

* * * * *